(12) United States Patent
Fuerst et al.

(10) Patent No.: US 10,035,330 B2
(45) Date of Patent: Jul. 31, 2018

(54) FAN CASE FOR AN AIRCRAFT ENGINE

(71) Applicant: FACC AG, Ried im Innkreis (AT)

(72) Inventors: Walter Fuerst, Ried im Innkreis (AT); Ernst Haugeneder, Ried im Innkreis (AT); Konstantin Horejsi, Ried im Innkreis (AT); Boris Stubna, Ried im Innkreis (AT); Andreas Hoellrigl, Ried im Innkreis (AT)

(73) Assignee: FACC AG, Ried im Innkreis (AT)

( * ) Notice: Subject to any disclaimer, the term of this patent is extended or adjusted under 35 U.S.C. 154(b) by 0 days.

(21) Appl. No.: 15/517,932

(22) PCT Filed: Oct. 9, 2015

(86) PCT No.: PCT/AT2015/050251
§ 371 (c)(1),
(2) Date: Apr. 7, 2017

(87) PCT Pub. No.: WO2016/054669
PCT Pub. Date: Apr. 14, 2016

(65) Prior Publication Data
US 2017/0305117 A1    Oct. 26, 2017

(30) Foreign Application Priority Data

Oct. 10, 2014    (AT) .............................. A 50723/2014

(51) Int. Cl.
*B32B 17/04*    (2006.01)
*B32B 17/06*    (2006.01)
(Continued)

(52) U.S. Cl.
CPC ................ *B32B 17/04* (2013.01); *B32B 3/12* (2013.01); *B32B 5/245* (2013.01); *B32B 17/066* (2013.01);
(Continued)

(58) Field of Classification Search
CPC .......... F01D 21/045; F01D 24/24; F02C 7/04; B32B 3/12; B32B 5/245; B32B 17/04;
(Continued)

(56) References Cited

U.S. PATENT DOCUMENTS 5,516,258 A * 5/1996 Newton ................ F01D 21/045
415/200
6,053,696 A * 4/2000 Roberts ................ F01D 21/045
415/200
(Continued)

FOREIGN PATENT DOCUMENTS

EP    1344895 A2    9/2003
EP    2096269 A2    9/2009
(Continued)

OTHER PUBLICATIONS

ISA European Patent Office, International Search Report Issued in Application No. PCT/AT2015/050251, dated Jan. 29, 2016, WIPO, 4 pages.
(Continued)

*Primary Examiner* — Igor Kershteyn
(74) *Attorney, Agent, or Firm* — McCoy Russell LLP

(57) ABSTRACT

The invention relates to a fan case for an aircraft engine in the region of the fan thereof, comprising a plurality of substantially cylindrically arranged fiber-reinforced plastic layers that are joined together, wherein a reinforcement ply made of a glass fiber-reinforced plastic is disposed between an inner layer and an outer layer. According to the invention, the reinforcement ply consists of at least 20 plies of a glass fiber-reinforced plastic, and that deformation layers are disposed on both sides of the reinforcement ply, which deformation layers have a lower strength than the reinforcement ply.

20 Claims, 1 Drawing Sheet

(51) Int. Cl.
  *B32B 17/10* (2006.01)
  *B32B 3/12* (2006.01)
  *B32B 5/24* (2006.01)
  *F01D 21/04* (2006.01)
  *F01D 25/24* (2006.01)
  *F02C 7/04* (2006.01)
  *F04D 29/52* (2006.01)

(52) U.S. Cl.
  CPC ...... *B32B 17/10073* (2013.01); *F01D 21/045* (2013.01); *F01D 25/24* (2013.01); *F02C 7/04* (2013.01); *B32B 2250/05* (2013.01); *B32B 2605/18* (2013.01); *F04D 29/526* (2013.01); *F05D 2240/14* (2013.01)

(58) Field of Classification Search
  CPC ............ B32B 17/066; B32B 17/10073; B32B 2605/18; B32B 2250/05; F05D 2240/14; F04D 29/526
  See application file for complete search history.

(56) References Cited

U.S. PATENT DOCUMENTS

| | | | | |
|---|---|---|---|---|
| 6,497,550 | B2 * | 12/2002 | Booth | F01D 21/045 415/173.4 |
| 7,246,990 | B2 * | 7/2007 | Xie | F01D 21/045 415/173.4 |
| 7,959,405 | B2 * | 6/2011 | Launders | F01D 21/045 415/9 |
| 8,057,171 | B2 * | 11/2011 | Evans | F01D 21/045 415/214.1 |
| 8,403,624 | B2 * | 3/2013 | Xie | B29C 70/086 415/173.1 |
| 2005/0089390 | A1 * | 4/2005 | Gerain | F01D 11/125 415/9 |
| 2008/0128073 | A1 | 6/2008 | Xie et al. | |
| 2010/0329843 | A1 | 12/2010 | Marlin et al. | |
| 2012/0076647 | A1 * | 3/2012 | Robertson, Jr. | F01D 21/045 415/182.1 |
| 2012/0148392 | A1 | 6/2012 | Lussier et al. | |
| 2012/0224958 | A1 | 9/2012 | Reed et al. | |

FOREIGN PATENT DOCUMENTS

| | | |
|---|---|---|
| EP | 2434105 A2 | 3/2012 |
| FR | 2925118 A1 | 6/2009 |
| GB | 2426287 A | 11/2006 |
| GB | 2442112 A | 3/2008 |
| GB | 2471465 A | 1/2011 |
| GB | 2498194 A | 7/2013 |

OTHER PUBLICATIONS

International Bureau of WIPO, International Preliminary Report on Patentability Issued in Application No. PCT/AT2015/050251, dated Apr. 13, 2017, WIPO, 6 pages.

* cited by examiner

FAN CASE FOR AN AIRCRAFT ENGINE

CROSS-REFERENCE TO RELATED APPLICATIONS

The present application is a U.S. National Phase of International Patent Application Serial No. PCT/AT2015/050251, entitled "FAN CASE FOR AN AIRCRAFT ENGINE," filed on Oct. 9, 2015. International Patent Application Serial No. PCT/AT2015/050251 claims priority to Austrian Patent Application No. A 50723/2014, filed on Oct. 10, 2014. The entire contents of each of the above-cited applications are hereby incorporated by reference for all purposes.

TECHNICAL FIELD

The invention relates to a fan case and/or blower case for an aircraft engine in the region of the fan thereof, comprising a plurality of substantially cylindrically arranged fiber-reinforced plastic layers that are joined together, wherein a reinforcement ply made of a glass fiber-reinforced plastic is disposed between an inner layer and an outer layer.

BACKGROUND AND SUMMARY

Fan cases of aircraft engines are used to prevent destruction of the engine in the region of the fan and to protect the passengers inside the aircraft from harm in case of damage when a blade of the fan becomes disconnected. The materials for such fan cases must be selected so that the high kinetic energy of the disconnected fan blade can be absorbed. While metals, in particular high-ductility steels or titanium alloys, were primarily used for producing fan cases in the past, in recent times plastic has been used for these aircraft components as well.

For example, US 2012/0148392 A1 describes a fan case made of a fiber-reinforced plastic for an aircraft engine, wherein a plurality of composite layers that are joined together are combined with honeycomb structures disposed between them. A jacket made of Kevlar® provides adequate protection in case of damage when a fan blade becomes disconnected and enters the engine housing.

US 2008/0128073 A1 describes a fan case for aircraft engines which is made of various plastic composites in a layered structure using various fiber materials and combinations thereof.

GB 2 426 287 A describes a fan case in which metallic structures are provided for meeting the safety requirements.

EP 2 096 269 A2 and EP 1 344 895 A2 describe engine linings which are used for optimizing the airflow within the engine, but do not provide safety in case of damage when a fan blade breaks.

Many constructions of fan cases made of a fiber-reinforced plastic are relatively labor-intensive in production and/or require a multiplicity of material plies so the weight advantage with respect to metal fan cases is no longer present or only present to a very limited extent.

Therefore, the object of the present invention is to provide a fan case for an aircraft engine which is as lightweight as possible and safe at the same time. Drawbacks of known devices are to be eliminated or at least reduced.

In order to achieve the object according to the invention, the reinforcement ply consists of at least 20 plies of a glass fiber-reinforced plastic and deformation layers are disposed on both sides of the reinforcement ply, which deformation layers have a lower strength than the reinforcement ply. The fan case construction according to the invention is distinguished by at least three layers being provided, namely the inner layer, the reinforcement ply and the outer layer, for which special materials are used to achieve the objects according to the invention, namely the protection of the aircraft engine in case of damage, on the one hand, and the retaining of a certain residual strength of the aircraft engine for a safe landing, on the other hand. In the fan case according to the invention, the two objects are achieved by means of two different components so the materials of these components may be adapted perfectly to the respective object. The reinforcement ply made of a glass fiber-reinforced plastic in the middle is mainly used to prevent a disconnected fan blade from passing through the case and to withstand the impact. Corresponding to this, glass fiber-reinforced plastic is used as it exhibits the best properties with respect to an impact of a fan part. By arranging at least 20 plies made of a glass fiber-reinforced plastic, the usually required strengths are obtained. In aircraft engines with particularly high speed and/or for smaller business jets, a higher number of plies, for example 35 plies, may also be required in order to meet the safety requirements. Due to the position of the installation of the reinforcement ply with the surrounding deformation layers within the fan case, said reinforcement ply is also protected from damage, such as by falling rocks, and the weight advantage may be obtained. On the other hand, the residual strength required for a safe landing in case of damage is mainly ensured by the outer layer of the fan case. Preferably, the objective fan case is especially suited for aircraft engines with very high speeds (>10000 revolutions per minute) in which the kinetic energy of a disconnected part of the fan is particularly high. Depending on the design, the weight of the fan case may be reduced between 30% and 50% with respect to steel constructions and by up to 10% with respect to titanium constructions.

At least one deformation layer may be formed by a honeycomb structure. Such a honeycomb structure is characterized by a particularly low weight. In case of damage, the deformation layer is deformed accordingly, and at least the outer layer of the fan case is prevented from unacceptably high deformation.

At least one deformation layer may also be formed by a foam material. By selecting adequate foam materials and possibly combining it with the deformation layer consisting of a honeycomb structure, the weight and/or deformability may be further improved. Plastics such as acrylonitrile butadiene styrene copolymer (ABS), polymethacrylimid (PMI) and the like are used as the foam material.

Advantageously, at least one fastening flange is integrated within the outer layer. By integrating at least one fastening flange, in particular two fastening flanges (front and back), the strength of the entire fan case is increased, since no joining sites are required between the fastening flange and the outer layer, while the mounting process is simplified.

On the inner layer of the fan case, an abrasive layer made of a deformable material may be disposed in the region of the fan. By using such an abrasive layer made of a deformable material, the air gap between the fan of the aircraft engine and the inner layer of the fan case may be further reduced since the fan blade having the largest outer diameter cuts a corresponding shape into the abrasive layer.

The abrasive layer may be made of a glass fiber-reinforced resin or filled honeycomb cores. Such materials have proven particularly useful and are sufficiently soft with respect to the fan blades, which are usually made of titanium or titanium alloys.

By disposing a deflection ring made of a material having a higher strength than the deformation layers between the inner layer and the reinforcement ply in the region of the fan, safety may be improved in case of a breaking fan blade and/or material may be saved in the inner layer and/or reinforcement layer while retaining the same degree of safety. The deflection ring is used to deflect the radially occurring forces, which are substantially punctual, to the sides and thus counteract destruction of the fan case and/or engine housing.

The deflection ring is preferably made of metal, in particular steel. Due to the small size of the deflection ring with respect to the entire fan case, the weight disadvantage it causes is negligible.

Alternatively, the deflection ring may also be made of an aramid fiber-reinforced plastic, for example Kevlar®. Such fiber-reinforced plastics have a lower weight than metals, but are also correspondingly more expensive.

If the deflection ring has a wedge-shaped cross-section with an inclined surface oriented towards the fan, the radially occurring force originating from a disconnected part of a fan blade may be deflected and distributed to the sides so that, consequently, the risk of destruction of the fan case or engine housing and the hazard for the aircraft and the passengers may be reduced.

The outer layer and the inner layer of the fan case are preferably made of a carbon fiber-reinforced plastic. The outer layer of the fan case, in particular, is formed by an accordingly high number of layers of a carbon fiber-reinforced plastic in order to provide sufficient stability to the aircraft engine in case of damage and ensure a safe landing of the aircraft.

BRIEF DESCRIPTION OF THE FIGURES

The invention is explained in more detail by means of an exemplary embodiment below. Therein.

DETAILED DESCRIPTION

Figure 1:
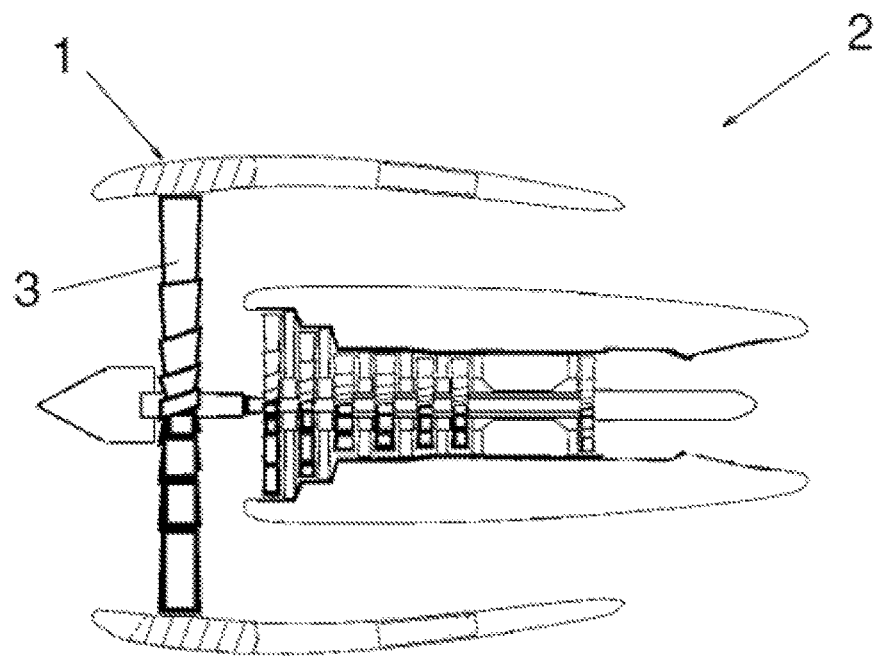
FIG. 1 shows an aircraft engine, partially in section, in an arrangement having a fan case disposed in the region of the fan.

FIG. 1 illustrates an aircraft engine 2, partially in section, in an arrangement having a fan case 1 disposed in the region of the fan 3. Typically, a fan case 1 consists of a cylindrical jacket having fastening flanges and possible strengthening ribs or the like integrated therein and/or attached thereto. The fan case 1 is connected to the remaining engine housing, which is again arranged on corresponding fastening elements, usually wings.

Figure 2:
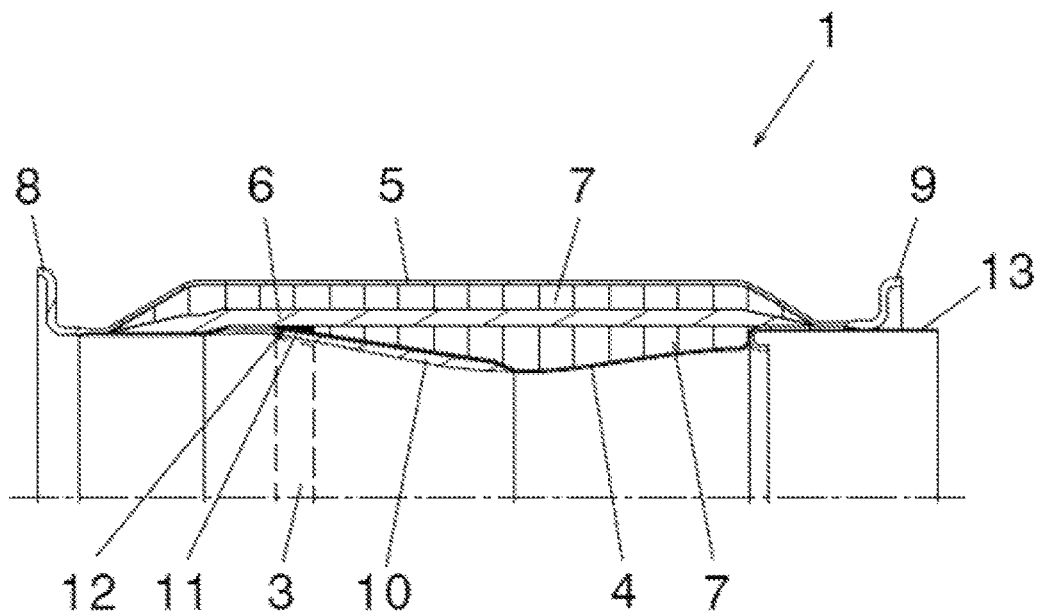
FIG. 2 shows a part of a fan case designed according to the invention, illustrated in section.

FIG. 2 shows a part of a fan case 1 designed according to the invention, illustrated in section. The fan case 1 includes an inner layer 4 designed according to the aerodynamic requirements of the aircraft engine 2 and an outer layer 5 as well as a reinforcement ply 6 disposed between the inner layer 4 and the outer layer 5, and deformation layers 7 disposed on both sides of the reinforcement ply 6. Depending on the aircraft engine 2, the reinforcement ply 6 is formed by at least 20 plies of a glass fiber-reinforced plastic and is mainly used to withstand an impact of a part of the fan 3 in case of damage. The deformation layers 7, which may be formed by a honeycomb structure or suitable foam materials or combinations thereof, are used to absorb the kinetic energy originating from a disconnected part of the fan 3. The inner layer 4 may be made of a carbon fiber-reinforced plastic. The outer layer 5, which is mainly used to ensure residual strength of the fan case 1 in case of damage and to allow a safe landing with the damaged aircraft engine 2, is preferably made of a carbon fiber-reinforced plastic as well.

To simplify the work for production and mounting, the fastening flanges 8, 9 required for fastening the fan case 1 may be integrated within the outer layer 5 and be produced in one manufacturing process together with the outer layer 5. Due to the functional separation of the reinforcement ply 6 and the outer layer 5, tearing of the outer layer 5, in particular in the region of the fastening flanges 8, 9, can be prevented in case of damage, or at least the risk of damage can be reduced.

To reduce the air gap between the fan 3 and the inner layer 4, an abrasive layer 10 made of a deformable material may be disposed in the region of the fan 3, with the fan blade having the largest outer diameter cutting into the abrasive layer 10, resulting in a vanishingly small air gap between the fan 3 and the inner layer 4 and/or the abrasive layer 10. The abrasive layer 10 may be made of a glass fiber-reinforced resin or filled honeycomb cores.

In the region of the fan 3, a deflection ring 11 made of a material having a higher strength than the deformation layers 7 may be disposed between the inner layer 4 and the reinforcement ply 6, by which deflection ring 11 the radial forces occurring in case of damage are deflected to the sides. The deflection ring 11 may be made of metal, in particular steel, or also an aramid fiber-reinforced plastic, for example Kevlar®. For an ideal deflection of the radially acting forces, the deflection ring 11 may have a wedge-shaped cross-section with an inclined surface 12 oriented towards the fan 3, as illustrated.

At the rear end of the fan case 1, an extension element 13 may be disposed and preferably glued to the inner layer 4.

The invention claimed is:

1. A fan case for an aircraft engine in a region of a fan thereof, comprising a plurality of substantially cylindrically arranged fiber-reinforced plastic layers that are joined together, wherein a reinforcement ply made of a glass fiber-reinforced plastic is disposed between an inner layer and an outer layer, wherein the outer layer and the inner layer are made of a carbon fiber-reinforced plastic, the reinforcement ply consists of at least 20 plies of a glass fiber-reinforced plastic, that deformation layers are disposed on both sides of the reinforcement ply, which deformation layers have a lower strength than the reinforcement ply, and that a deflection ring made of a material having a higher strength than the deformation layers is disposed between the inner layer and the reinforcement ply in the region of the fan, wherein the deflection ring has a wedge-shaped cross-section with an inclined surface oriented towards the fan.

2. The fan case according to claim 1, wherein at least one deformation layer is formed by a honeycomb structure.

3. The fan case according to claim 1, wherein at least one deformation layer is formed by a foam material.

4. The fan case according to claim 1, wherein at least one fastening flange is integrated within the outer layer.

5. The fan case according to claim 1, wherein on the inner layer an abrasive layer made of a deformable material is disposed in the region of the fan.

6. The fan case according to claim 5, wherein the abrasive layer is made of a glass fiber-reinforced resin.

7. The fan case according to claim 1, wherein the deflection ring is made of metal.

8. The fan case according to claim 1, wherein the deflection ring is made of an aramid fiber-reinforced plastic.

9. The fan case according to claim 2, wherein at least one deformation layer is formed by a foam material.

10. The fan case according to claim 2, wherein on the inner layer an abrasive layer made of a deformable material is disposed in the region of the fan.

11. The fan case according to claim 4, wherein on the inner layer an abrasive layer made of a deformable material is disposed in the region of the fan.

12. The fan case according to claim 4, wherein the deflection ring is made of metal.

13. The fan case according to claim 5, wherein the deflection ring is made of metal.

14. The fan case according to claim 4, wherein the deflection ring is made of an aramid fiber-reinforced plastic.

15. The fan case according to claim 5, wherein the deflection ring is made of an aramid fiber-reinforced plastic.

16. The fan case according to claim 12, wherein the deflection ring is made of steel.

17. The fan case according to claim 13, wherein the deflection ring is made of steel.

18. The fan case according to claim 2, wherein the deflection ring is made of an aramid fiber-reinforced plastic.

19. The fan case according to claim 3, wherein the deflection ring is made of an aramid fiber-reinforced plastic.

20. The fan case according to claim 7, wherein the deflection ring is made of steel.

* * * * *